US005731064A

United States Patent [19]

Süss

[11] Patent Number: 5,731,064

[45] Date of Patent: Mar. 24, 1998

[54] STAMPING FOIL, IN PARTICULAR A HOT STAMPING FOIL WITH DECORATIVE OR SECURITY ELEMENTS

[75] Inventor: Joachim Süss, Fürth, Germany

[73] Assignee: Leonhard Kurz GmbH & Co., Germany

[21] Appl. No.: 765,297

[22] PCT Filed: Jun. 10, 1995

[86] PCT No.: PCT/DE95/00784

§ 371 Date: Dec. 20, 1996

§ 102(e) Date: Dec. 20, 1996

[87] PCT Pub. No.: WO96/01187

PCT Pub. Date: Jan. 18, 1996

[30] Foreign Application Priority Data

Jul. 2, 1994 [DE] Germany .......................... 44 23 291.8

[51] Int. Cl.[6] ........................................ B32B 9/00

[52] U.S. Cl. .......................... 428/195; 428/46; 428/172; 428/203; 428/209; 428/327; 428/339; 428/344; 428/352; 428/423.7; 428/480; 428/488.4; 428/913; 427/147; 427/250; 156/230; 156/240; 156/247

[58] Field of Search .................................. 428/352, 347, 428/327, 480, 423.7, 483, 914, 488.4, 913, 204, 203, 46, 195, 209, 344, 346, 354, 339, 172, 349; 156/230, 234, 240, 247, 241, 233, 239; 427/147, 148, 250, 264, 265

[56] References Cited

U.S. PATENT DOCUMENTS

| | | | |
|---|---|---|---|
| 4,426,422 | 1/1984 | Daniels | 428/352 |
| 5,102,497 | 4/1992 | Hamaguchi et al. | 156/656 |
| 5,300,169 | 4/1994 | Tahara | 156/230 |

*Primary Examiner*—Patrick Ryan
*Assistant Examiner*—Abraham Bahta
*Attorney, Agent, or Firm*—Louis E. Marn; Clifford G. Frayne

[57] ABSTRACT

There is disclosed a hot stamping foil assembly, in particular a hot stamping foil, which has spatial decorative or security elements formed in a region-wise manner. An adhesive layer is provided only in a region-wise manner and in matching relationship with respect to the spatial elements to effect transfer of the spatial decorative or security elements or other decorative layer structure.

15 Claims, 1 Drawing Sheet

STAMPING FOIL, IN PARTICULAR A HOT STAMPING FOIL WITH DECORATIVE OR SECURITY ELEMENTS

BACKGROUND OF THE INVENTION

1. Field of the Invention

The invention concerns a stamping foil, in particular a hot stamping foil, comprising a carrier film and a transfer layer assembly which is detachable therefrom and which-starting from the carrier film—has at least a transparent protective lacquer layer, a decoration layer structure which is formed by at least one layer and which includes decorative or security elements, and an adhesive layer serving to fix the transfer layer assembly on a substrate.

2. Description of the Related Art

Stamping foils of that kind and in particular hot stamping foils are known in a very wide range of different configurations. In use thereof, the transfer layer assembly is transferred from the carrier film onto a substrate under the effect of heat and pressure. The corresponding transfer layer assembly adheres to the substrate by means of the adhesive layer which is generally a hot adhesive or an adhesive which can be caused to harden by radiation. Now, in a large number of situations of use, the position is that the transfer layer assembly is not to be transferred over its full surface area onto the substrate, but only certain regions of the transfer layer assembly, for example decorative elements which are produced in the transfer layer assembly in per se known manner by means of printing processes etc. are to be transferred. Hot stamping foils are also used to a great extent in particular for applying security elements for example to value-bearing papers such as banknotes, credit cards, passes and identity cards etc. or other articles to be safeguarded. In that respect, it is important that only the respective security element, or the region of the transfer layer assembly which corresponds to the security element, is released from the carrier film and fixed on the substrate.

Hitherto, if the transfer layer assembly is to be transferred onto the substrate only in a region-wise manner, the procedure generally adopted is such that the stamping foil is pressed against the substrate by means of dies or stamping punches of suitable configuration. The required pressure is then applied to the transfer layer assembly only in the region of the stamping punches, and that is intended to provide that only the part of the transfer layer assembly which is acted upon by the punch member adheres to the substrate, while the remainder of the transfer layer assembly is pulled off with the carrier film.

That procedure suffers from a number of disadvantages. On the one hand, it has been found that the high operating speeds which are required precisely when producing large numbers of items, for example when printing banknotes, and consequently the high levels of transfer capacity, can be achieved in a simple manner only when rolling processes are used for applying the stamping foil transfer to the substrate. In that respect, difficulties are involved in so designing rollers that the surface thereof forms individual stamping punch portions, by virtue of suitably raised regions of that surface. With this kind of operation, problems are also incurred in regard to accurate alignment of the decorative or security element to be transferred, with the stamping region which is respectively used for the transfer operation.

If only regions of the transfer layer assembly are to be transferred from the carrier film onto the substrate by means of a stamping punch, there is also the problem that only quite specific materials can be used for the transfer layer assembly. In actual fact, the materials must be so selected that the transfer layer assembly tears off cleanly along the edge of the stamping punch member, while in addition it is necessary to ensure, by virtue of a specific choice of the release layer between the transfer layer assembly and the carrier film, that the transfer layer assembly easily detaches from the carrier film in the regions which are to be transferred onto the substrate, but in the other regions it adheres satisfactorily to the carrier film. Particularly if, in an operation of that kind, the temperature and pressure conditions are not precisely correct, hitherto it very frequently occurs that the transfer layer assembly does not tear off cleanly along the edge of the stamping punch member. Another disadvantage is that transfer layer assemblies which easily tear along the edge of the stamping punch member generally have a low level of mechanical strength; in the case for example of a security element but also in the case of a decorative element, this means that it is frequently destroyed after just a very short period of time in use of the corresponding article, as a result of mechanical effects.

In addition, the attempt has already been made to achieve improvements in this respect by using stamping foils without an adhesive layer, in which case the adhesive was then applied in the regions of the substrate which were to be decorated, and the transfer layer assembly was detached from the stamping foil by means of the adhesive. When adopting a procedure of that kind, it is admittedly possible to operate with smooth rollers for applying pressure and heat. In the same manner as when using stamping punch members however, there are the problems relating to the composition of the transfer layer assembly which, with this procedure also, must be of such a nature that it tears with suitable ease, which however again results in it having a low level of mechanical strength. The problems of defective matching as between the adhesive and the decorative or security elements of the transfer layer assembly are also not overcome in this way.

The object of the present invention is therefore that of so designing a stamping foil and in particular a hot stamping foil that, without particular measures being required, it is possible for individual regions of the transfer layer assembly, in particular in the form of decorative or security elements, to be transferred onto a substrate in accurately matching relationship, wherein no stamping punch members of a particular configuration are required for transfer onto the substrate, but for example rollers or cylinders can be used for that operation. Furthermore, in a procedure in accordance with the invention, it is also to be possible for the transfer layer assembly to be of substantially more stable nature and thus mechanically stronger.

SUMMARY OF THE INVENTION

To attain that object, the invention proposes that a stamping foil and in particular a hot stamping foil of the kind set forth in the opening part of this specification is of such a configuration that at least the adhesive layer is provided only in a region-wise manner and in matching relationship with a further layer which is also present only in region-wise manner, or the decorative or security elements, which are only provided in a region-wise manner, of the transfer layer assembly.

Accordingly, an important consideration in regard to the stamping foils according to the invention that, as a result of the adhesive layer being applied only in a region-wise manner, the invention guarantees that the transfer layer assembly adheres to the substrate only where the adhesive layer is present. It is therefore immaterial whether pressure is possibly also applied to the transfer layer assembly, outside the adhesive layer. Nonetheless, only the region of the transfer layer assembly, which coincides with the adhesive layer, can adhere to the substrate. This means that the operation of applying the transfer layer assembly to the substrate is substantially independent of the form of the tool used for applying pressure and possibly heating the assembly. Therefore, when using a stamping foil according to the invention, it is for example possible to provide for region-wise decoration or labelling or the like of a substrate in a continuous process, for example by means of rollers or cylinders. A further advantage of the stamping foil according to the invention is also that satisfactory coincidence between the adhesive layer which is present in a region-wise manner and the regions of the transfer layer assembly which are to be transferred can be achieved without difficulty because usually both the various layers making up the transfer layer assembly and also the adhesive layer are applied in a printing process. As is known, satisfactory alignment of various layers which are disposed one upon the other does not give rise to any difficulties when using a printing process. A further advantage with the procedure according to the invention is that stamping foils according to the invention can also be produced for substrates with a very rough surface, for example paper, with excellent adhesion and physical-chemical resistance.

In comparison with the previously conventional procedure therefore, the use of a stamping foil according to the invention affords considerable advantages in regard to the tools which can be used for transfer onto the substrate, and also in particular in regard to the degree of accuracy in delimiting the regions of the transfer layer assembly, which are to be applied to the substrate. Furthermore the stamping foil according to the invention, with the adhesive layer which is provided only a region-wise manner, permits the use of layers which are substantially mechanically more stable for the transfer layer assembly, in a large number of cases. Even if, in such a situation, during the transfer operation, the delimitation of the region of the transfer layer assembly, which is applied to the substrate, is not clean and neat, any transfer layer assembly material which possibly projects beyond the adhesive layer can be very easily removed in a further working operation as the transfer layer assembly adheres very firmly to the substrate in the region of the adhesive layer.

In order to facilitate detachment of the transfer layer assembly from the carrier film, a release layer can be provided between the carrier and the transfer layer assembly in per se known manner. In that respect, it is particularly advantageous if, in accordance with the invention, the release layer is provided only in a region-wise manner and in matching relationship with the adhesive layer. Such a configuration for the stamping foil provides that, in the regions where there is no release layer, those regions coinciding with the regions were there is no adhesive layer, the transfer layer assembly adheres comparatively firmly to the carrier film, thereby assisting with the transfer layer assembly being torn off or severed along the edge of the region to be transferred.

For the situation where the release layer is provided only in region-wise manner and in matching relationship with the adhesive layer, in accordance with the invention the protective lacquer layer can be provided over the full surface area and can be formed by a lacquer which has good adhesion to the carrier film outside the regions covered by the release layer, this being a measure which also assists with clean separation along the edge of the regions of the transfer layer assembly, which are to be transferred.

It is further provided in accordance with the invention that the protective lacquer layer is provided only in a region-wise manner and in matching relationship with the adhesive layer. This embodiment has in particular the advantage that it is possible to use protective lacquer layers which are mechanically particularly stable, because in fact the protective lacquer layer must not be torn or severed during the operation of applying the assembly to the substrate. Such an embodiment will be used in particular when the substrates or articles which are to be safeguarded or decorated with the stamping foil according to the invention are exposed to high mechanical loadings, as is the case for example in regard to banknotes, cards for automatic machines and vending machines, etc.

In recent times, spatial structures with an optical-diffraction effect are frequently used in particular as security elements, as such structures can only be forged with comparative difficulty, and can also give particular effects when an attempt is made to copy them. In this connection, the invention proposes that the decorative or security elements are formed by spatial structures which have an optical-diffraction effect and which are provided in the protective lacquer layer on the side thereof which is remote from the carrier film, the structures being arranged in matching relationship with respect to the adhesive layer. The additional arrangement of such security elements in a transparent protective lacquer layer is known. An important consideration however is that arranging the spatial structures in matching relationship with the adhesive layer provides for satisfactory alignment and clean accurate delimitation of the spatial structures, and also provides that the structures do not fray in particular in the region of their edge, whereby hitherto the entire appearance of a security element and further processing, for example printing on the value-bearing document, could possibly be adversely affected.

For improved visibility of the spatial structures, the side of the protective lacquer layer which has the spatial structures can in per se known manner have a coating whose optical properties differ from those of the protective lacquer layer, the coating being formed in particular by a reflecting material, preferably metal.

Although in accordance with the invention the spatial structures are generally arranged in matching relationship with respect to the adhesive layer, it is particularly desirable if the coating is produced over the full surface area, more specifically for the reason that coatings can be applied over the full surface area substantially more easily and in particular without additional measures or working steps. Nonetheless, the coating over the full surface area does not usually cause any problems because the thicknesses of such coatings are so small that, when the foil is applied to the substrate, the coatings readily tear along the edge of the regions carrying the adhesive layer. It will be appreciated that, in the case of particularly high-grade foils, the coating can also be applied partially and in matching relationship with respect to the spatial structure, in order in that way to provide for particularly clean and accurate delimitation of the transferred layers.

Finally, it is in accordance with the invention for the protective lacquer layer and/or the release layer to project on all sides by at least 0.2 mm beyond the regions of the adhesive layer and/or the decorative or security elements. The fact that the protective lacquer layer and optionally the release layer project beyond the decorative or security elements and at the same time beyond the adhesive layer affords the advantage that, in the transfer procedure, the protective lacquer layer is applied to the substrate closely along the edge of the protective lacquer layer; in that case, the projecting portion of the protective lacquer layer generally also adheres satisfactorily to the substrate because, as a consequence of its thickness, even if it is only slight, the adhesive layer is nonetheless compressed in the transfer operation and is thus pressed outwardly in the direction of the edge of the protective lacquer layer.

BRIEF DESCRIPTION OF THE DRAWINGS

Further features, details and advantages of the invention will be apparent from the following description of three embodiments of hot stamping foils according to the invention, with reference to the drawing.

Figure 1:
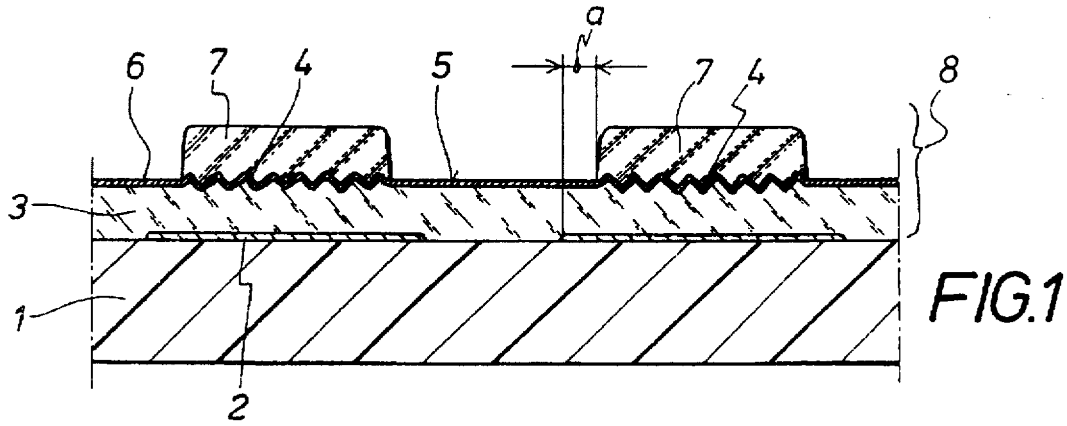
FIGS. 1 to 3 each show in section portions of the corresponding hot stamping foils.

It should be noted in this connection that the thicknesses of the various layers are not shown true to scale.

DETAILED DESCRIPTION OF THE DRAWINGS

The hot stamping foils in accordance with the illustrated embodiments each include a carrier film 1, for example a polyester film of a thickness of a thickness of about 20 μm. A release layer 2 is applied to a surface of the carrier film 1, in a region-wise manner or over the full surface area thereof, the thickness of the release layer 2 being about 0.01 to 0.1 μm. A transparent protective lacquer layer 3 then follows the release layer 2, also over the full surface area (FIGS. 1 and 3) or in a region-wise manner (FIG. 2). When it is applied over the full surface area, the thickness of the protective lacquer layer 3 is from 0.8 to 2.5 μm, preferably from 1.2 to 1.7 μm. If on the other hand the protective lacquer layer is only partially provided, as shown in FIG. 2, the thickness thereof is from 1.5 to 3.0 μm, preferably from 2.0 to 2.5 μm, that is to say, when the protective lacquer layer 3 is applied in a region-wise or partial manner, the thickness thereof is usually greater than when the protective lacquer layer is applied over the full surface area.

In the illustrated embodiments, to form security elements but possibly also only to form decorative elements, in the regions which are intended to be transferred onto the substrate, the transparent protective or three-dimensional lacquer layer is provided with a spatial/structure 4 which has an optical-diffraction effect. The spatial structures 4 are formed by suitable replication or stamping by means of an appropriate master on the surface 5 of the protective lacquer layer, which is remote from the carrier film.

In order to render the spatial structures 4 particularly clearly visible, after application of the protective lacquer layer 3 and corresponding formation of the spatial structures 4 the entire free surface of the partially finished stamping foil is provided with a coating 6, preferably a suitable reflecting metal being applied by vapour deposition in a vacuum. The thickness of the coating 6 depends on which material is used for that purpose. If the material of the coating 6 is metal, the thickness of the coating 6 is of the order of magnitude of a few Å, more specifically 50–500 Å, preferably 100–200 Å. The coating 6 however can also be formed for example by a dielectric which has different optical properties in comparison with the material of the protective lacquer layer 3. Depending on the nature of the material, the thickness of the layer forming the coating 6 can then certainly be substantially greater.

The uppermost layer (in the drawing) of the hot stamping foils of the illustrated embodiments forms in each case an adhesive layer 7 which is applied only in a region-wise manner. The adhesive layer 7 is provided essentially only in the regions in which there are decorative or security elements, that is to say the spatial structures 4 in the illustrated embodiments.

Figure 3:
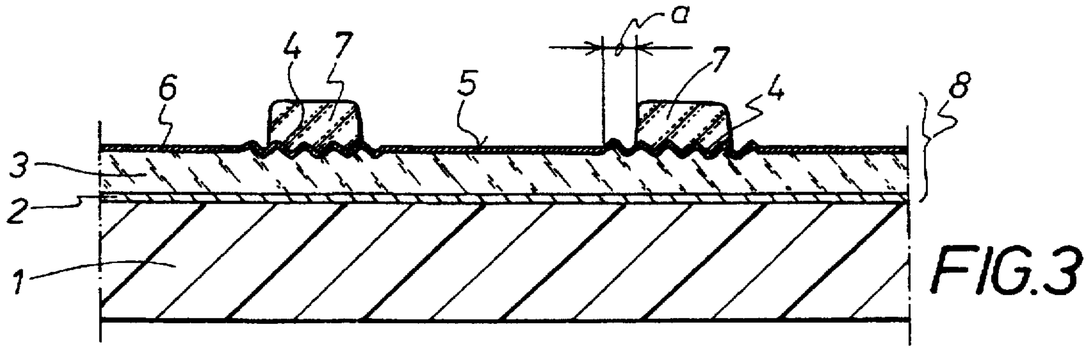

The adhesive layer 7 is usually applied in a thickness of from 3.0 to 10.0 μm, preferably from 4.0 to 6.0 μm The individual embodiments of which that shown in FIG. 3 is thought to be of the greatest significance in a practical context differ from each other in particular by virtue of the different regions in which the protective lacquer layer 3 and the release layer 2 are applied.

Figure 2:
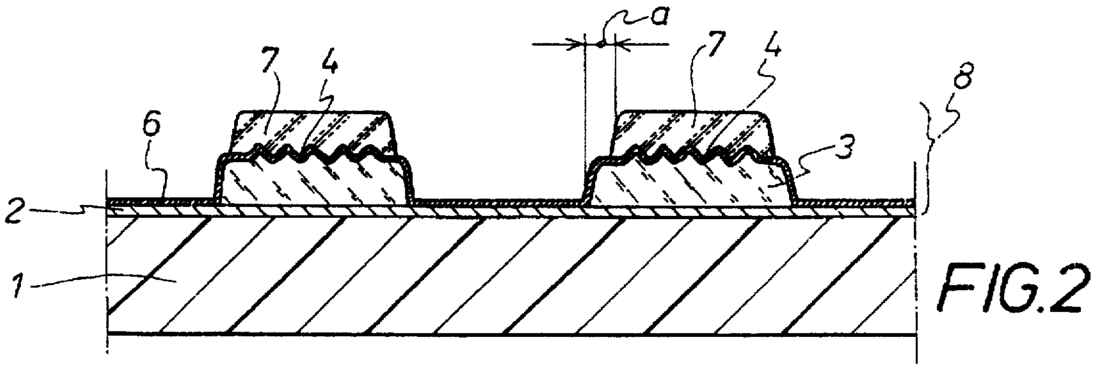

In the embodiment shown in FIG. 1, the release layer 2 is provided only in a region-wise manner, more specifically in the regions where there are the spatial structure 4 for forming the decorative or security elements on the protective lacquer layer 3, and the adhesive layer 7. In this respect, FIG. 1 shows that the release layer 2 projects on all sides beyond the spatial structure 4 and the adhesive layer 7 by a dimension a which should be at least 0.2 mm.

In the embodiment shown in FIG. 2, just as in FIG. 3, the release layer 2 is provided over the full surface area. In contrast to FIG. 1 however the protective lacquer layer 3 is provided only in a region-wise manner, more specifically, in a fashion corresponding to the adhesive layer 7, only in the regions where decorative or security elements are formed by the spatial structure 4. In that respect, similarly to the release layer 2 in FIG. 1, the protective lacquer layer 3 projects on all sides by the dimension a beyond the adhesive layer 7 and the spatial structure 4. In this case also the dimension a should be at least 0.2 mm.

Finally, in FIG. 3 both the release layer 2 and also the protective lacquer layer 3 are provided over the full surface area. Only the adhesive layer 7 is present only in the regions to be transferred, with the spatial structure 4. Once again, the adhesive layer 7 is set back relative to the spatial structure 4 by the dimension a of at least 0.2 mm.

Production of the hot stamping foils in accordance with the illustrated embodiments is effected in a manner which is known per se from the production of hot stamping foils, by a procedure whereby the release layer 2 and the protective lacquer layer 3 are applied to the carrier film 1 by a printing process, with a suitable layer thickness or distribution. The protective lacquer layer 3 is either thermoplastic or comprises a lacquer which fully hardens only under the effect of certain radiation or after a certain period of time after cross-linking. The spatial structure 4 is impressed into a thermoplastic protective lacquer layer 3 under the effect of heat, by means of per se known dies. If the protective lacquer layer 3 is a lacquer layer which hardens under the effect of certain radiation, for example UV-radiation, or only after a certain period of time, the spatial structure 4 is applied to the surface 5 of the protective lacquer layer 3 by a replication process, as long as the lacquer forming the layer 3 has not yet completely hardened.

The foil which is partially finished in that way is then provided with the coating 6, for example aluminium which is applied in a layer of suitable thickness by vapour deposition in a vacuum. In that connection, the coating 6 may be formed over the full surface area and also partially and in matching relationship with the spatial structure 4. Then, once again using a printing process, the adhesive layer 7 is applied in a region-wise manner. Matching relationship of the adhesive layer 7, with respect to the release layer 2 (FIG. 1), the protective lacquer layer 3 (FIG. 2) or the spatial structure 4 (FIG. 3), is achieved by suitable scanning of the layers which are already present on the carrier film 1. For that purpose, if the release layer 2 and the protective lacquer layer 3 are present only in a region-wise manner, those layers can have a suitable marking pigment added thereto.

The compositions of the individual layers can be as follows:

Release layer, over the full surface area (FIGS. 2 and 3)

Ethanol 98 g

Toluene 900 g

Ester wax (dropping point 90° C.) 2 g

Release layer, region-wise (FIG. 1)

Deionised water 740 g

Polyvinyl alcohol 8 g (degree of hydrolysis: 98.4 ±0.4 molar %)

Ethanol 250 g

Marking pigment (for example benzoxazole derivative) 2 g to permit matching relationship to be achieved Protective lacquer layer, over the full surface area (FIGS. 2 and 3)

MEK 400 g

Toluene 150 g

Cyclohexanone 200 g

Cellulose nitrate (low-viscosity, 65% in alcohol) 148 g

Butyl-/methylmethacrylate (d=1.05 g/cm$^3$, 102 g acid number 7–9 mg KoH/g)

Protective lacquer layer, region-wise (FIG. 2)

MEK 400 g

Toluene 130 g

Cyclohexanone 200 g

Cellulose nitrate (low viscosity, 65% in alcohol ) 98 g

Butyl-/methytmethacrylate (d=1.05 g/cm$^3$, 62 g acid number 7–9 mg KoH/g)

Hydroxy-functional acrylate (60% in EPA, OH-content 6%) 40 g

Marking pigment (for example benzoxazole derivative) 20 g to permit matching relationship to be achieved Polyisocyanate (50% ethylacetate, NCO-content 8% ) 50 g Adhesive layer, region-wise Composition 1

MEK 100 g

Xylene 200 g

Cyclohexanone 255 g

Polyvinylchloride terpolymer (Tg=90° C.) 290 g $SiO_2$50 g

Polyisocyanate (50% ethylacetate, NCO-content 8% ) 105 g

Composition 2

MEK 250 g

Toluene 340 g

Vinylchloride-/vinylacetate-copolymer 215 g (mp: 80° C.)

Thermoplastic polyurethane (d=1.18 g/cm$^3$) 135 g

Silicic acid, made water-repellent 60 g (particle size about 10 μm)

In the processing procedure, the stamping foils according to the invention are firstly pressed against a substrate, with the adhesive layer which is applied in a region-wise manner; in that operation, the pressing step can be effected for example by means of a steel wheel over the full surface area, but the pressing operation can also be effected by a suitable segment-type wheel. Then, under suitably high pressure and at a suitable temperature, the transfer layer assembly which is generally identified by reference numeral 8 and which comprises at least a protective lacquer layer 3, the coating 6 and the adhesive layer 7, is detached from the carrier film 1, assisted by the release layer 2, such detachment note specifically occurring essentially only in the regions in which there is an adhesive layer 7. If, as a result of excessive stability of the protective lacquer layer 3, the layer 3 should not tear away or be separated with a sharp contour, in the region of the edges of the adhesive layer 7, the superfluous protective lacquer layer 3 can be removed without serious problems by suitably mechanically acting on the element which is transferred onto the substrate, because in fact the protective lacquer layer 3 does not adhere to the substrate-as there is no adhesive layer 7 in the regions which are not desired. Normally however an additional working operation of that kind is not required.

If the stamping foils according to the invention are not in the form of hot stamping foils but are intended for cold processing, that is to say, the adhesive layer is already sticky at ambient temperature, it is possible for the carrier film 1 to be provided with a suitable coating on the side which is remote from the transfer layer assembly 8; that coating prevents the adhesive layer 7 from adhering to the carrier film 1 when the foils are rolled up.

I claim:

1. A stamping foil, which comprises:

a carrier film; and a transfer layer assembly detachably provided on said carrier film, said transfer layer assembly comprised of a transparent protective lacquer layer over a full surface area of said transfer layer assembly and including region-wise formed decorative elements, a decorative layer overlaying said transparent protective lacquer layer and an adhesive layer provided on said decorative layer in matching relationship to said decorative elements of said transparent protective lacquer layer.

2. The stamping foil as defined in claim 1 wherein a release layer is provided between said carrier film and said transfer layer assembly.

3. The stamping foil as defined in claim 2 wherein said release layer is provided region-wise in matching relationship to said decorative elements of said transparent protective lacquer layer.

4. The stamping foil as defined in claim 2 wherein said decorative elements extend at least about 0.2 mm beyond regions of said adhesive layer.

5. The stamping foil as defined in claim 3 wherein said release layer extends at least about 0.2 mm beyond said regions of said decorative elements of said transparent protective lacquer layer.

6. The stamping foil as defined in claim 3 wherein said transparent protective lacquer layer exhibits adhesive properties to said carrier film.

7. The stamping foil as defined in claims 1, 2 or 3 wherein said decorative elements exhibited an optical-diffraction effect.

8. The stamping foil as defined in claim 7 wherein said decorative layer between said decorative elements exhibit a different optical-diffraction effect than said optical-diffraction effect of said decorative elements.

9. The stamping foil as defined in claim 7 wherein said decorative layer is a reflecting material.

10. The stamping foil as defined in claim 9 wherein said reflecting material is a metal.

11. The stamping foil as defined in claim 8 wherein said decorative layer is a reflecting material.

12. The stamping foil as defined in claim 11 wherein said reflecting material is a metal.

13. The stamping foil as defined in claim 1 wherein said decorative layer is coextensive with said transparent protective lacquer layer.

14. The stamping foil as defined in claim 1 wherein said transparent protective layer is of thickness of from 0.8 to 2.5 mm.

15. The stamping foil as defined in claim 14 wherein said thickness is from 1.2 to 1.7 mm.

* * * * *